F. OVERMYER.
PUNCTURE TESTER.
APPLICATION FILED MAR. 31, 1919.
1,327,251.
Patented Jan. 6, 1920.
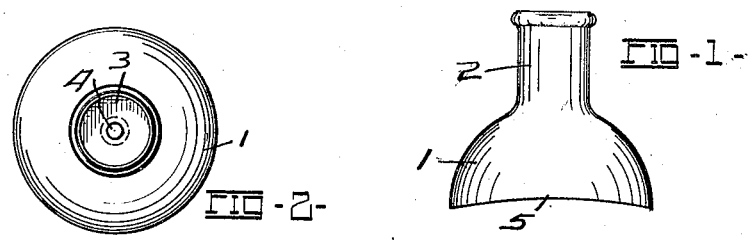
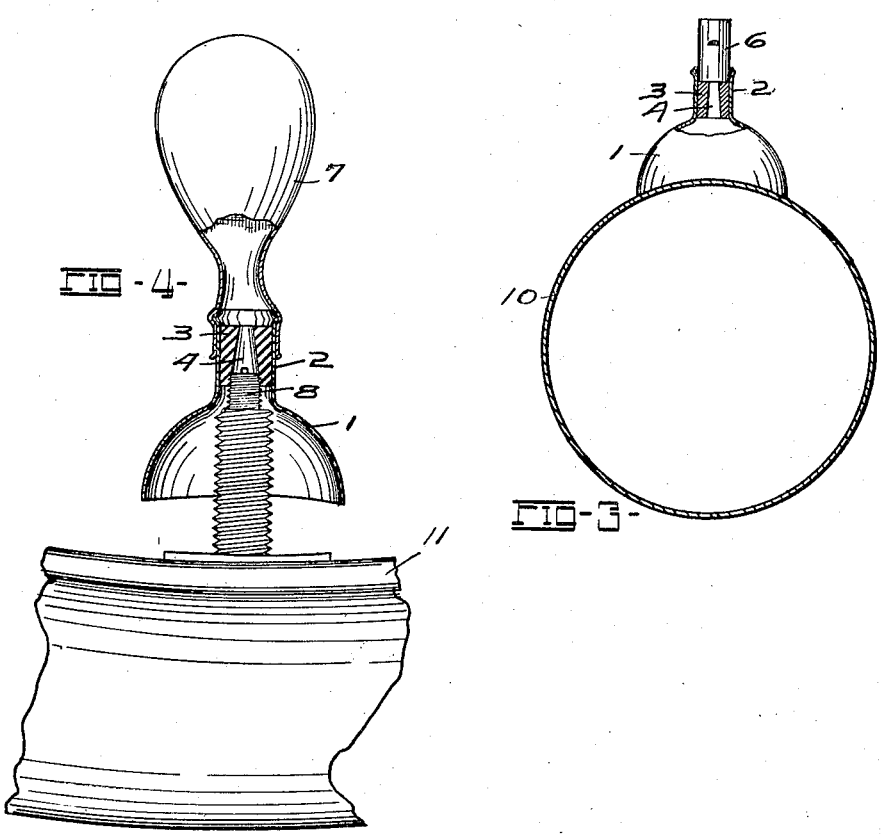
INVENTOR
Fred Overmyer.
by
Owen, Owen & Crampton

UNITED STATES PATENT OFFICE.

FRED OVERMYER, OF TOLEDO, OHIO.

PUNCTURE-TESTER.

1,327,251.  Specification of Letters Patent.  Patented Jan. 6, 1920.

Application filed March 31, 1919. Serial No. 286,542.

*To all whom it may concern:*

Be it known that I, FRED OVERMYER, a citizen of the United States, and a resident of Toledo, in the county of Lucas and State of Ohio, have invented a certain new and useful Puncture-Tester; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a simple and yet an exceedingly efficient means for detecting a leak of a gas container. It particularly has for its object to provide a leak detector of an automobile tire. It provides means for detecting any leakage produced in the tire valve of an automobile wheel and also a means that may be readily shifted over the surface of the inner tube of an automobile wheel and any leakage or escape of the air will be immediately detected, and the opening through which the escape takes place quickly located. The invention may be contained in structures of different forms. For purposes of illustrating a practical application of the invention I have selected one of such constructions containing the invention and shall describe it hereinafter. The structure selected is illustrated in the accompanying drawings.

Figure 1 of the drawings illustrates a side view of a shell used in connection with my invention, and Fig. 2 illustrates a top view. Fig. 3 illustrates a sectional view showing the application of a construction containing my invention, and Fig. 4 illustrates a modified form of the structure containing the invention.

1, Fig. 1, is a bell shaped shell which is provided with a neck 2 in which is located a rubber tube 3 having preferably a tapering opening 4. The lower edge or lip 5 of the bell may be curved so as to fit the surface of a tube, such as an inner tube of an automobile tire. To the neck is secured a suitable means for indicating movement of the air within the shell. In the form of the invention illustrated in Fig. 3 a whistle 6 may be inserted in the neck 3, and in the form of the invention illustrated in Fig. 4 a small rubber balloon 7 may be attached to the neck 3. The wall of the balloon 7 is very thin and light and consequently any slight indentation of the rubber, of which the balloon is composed, will be immediately straightened out by the very slightest increase of pressure of the air within the balloon.

In utilizing the leak detector the shell may be placed on an inner tube as indicated in Fig. 3, and the shell may be rapidly slipped over the surface of the inner tube and the movement of the air into the shell will be indicated either by the whistle 6 or by the movement of the balloon 7. The shell may be also so placed that contact will be made between the tube 3 and the end of the valve shell 8, sometimes called the valve stem of the tire. The tube 3 is preferably provided with the tapering opening 4 so that the lower end will readily fit over the edge of the shell 8 and thus perfect the connection with the shell 8. Any leakage of the valve stem will thus be immediately detected by movement of the balloon 7 or by the sound of the whistle 6.

I claim:—

1. In a leak detector, a shell, a gasket located in the shell and having a tapering interior surface, means connected to the shell for detecting movement of the air through the gasket.

2. In a leak detector, a shell having a neck, a tube located in the neck having a tapering bore, a balloon connected to the neck.

In testimony whereof I have hereunto signed my name to this specification.

FRED OVERMYER.